United States Patent
Li et al.

(10) Patent No.: US 6,567,408 B1
(45) Date of Patent: May 20, 2003

(54) METHODS AND APPARATUS FOR PACKET CLASSIFICATION WITH MULTI-LEVEL DATA STRUCTURE

(75) Inventors: Renwei Li, Vancouver (CA); Thomas W. Ng, Richmond (CA); Paul Terry, Coquitlam (CA); Henry Lee, Coquitlam (CA)

(73) Assignee: Redback Networks Inc., San Jose, CA (US)

( * ) Notice: Subject to any disclaimer, the term of this patent is extended or adjusted under 35 U.S.C. 154(b) by 0 days.

(21) Appl. No.: 09/316,469

(22) Filed: May 21, 1999

Related U.S. Application Data (60) Provisional application No. 60/118,156, filed on Feb. 1, 1999.

(51) Int. Cl.[7] ............................................... H04L 12/56
(52) U.S. Cl. .............................. 370/395.31; 370/395.43
(58) Field of Search .......................... 370/392, 395.31, 370/395.32, 395.43, 395

(56) References Cited

U.S. PATENT DOCUMENTS

| | | | |
|---|---|---|---|
| 4,736,363 A | | 4/1988 | Aubin et al. |
| 5,781,772 A | * | 7/1998 | Wilkinson et al. .......... 370/229 |
| 6,011,795 A | * | 1/2000 | Varghese et al. ............ 370/392 |
| 6,014,659 A | * | 1/2000 | Wilkinson et al. .......... 370/351 |
| 6,052,683 A | * | 4/2000 | Irwin ............................. 707/6 |
| 6,067,574 A | * | 5/2000 | Tzeng ........................ 707/101 |
| 6,075,791 A | | 6/2000 | Chiussi et al. |
| 6,147,976 A | * | 11/2000 | Shand et al. ................. 370/254 |
| 6,212,184 B1 | * | 4/2001 | Venkatachary et al. ..... 370/238 |

FOREIGN PATENT DOCUMENTS

| | | |
|---|---|---|
| EP | 0859492 A2 | 8/1998 |
| WO | WO 98/23080 A | 5/1998 |
| WO | WO98/26510 | 6/1998 |
| WO | WO 98/45976 | 10/1998 |
| WO | WO 00/08817 A | 2/2000 |
| WO | WO 00/11885 A | 3/2000 |
| WO | PCT/CA 00/00939 | 9/2001 |

OTHER PUBLICATIONS

PCT/CA 00/00940, International Search Report, 2 pages, Jul. 23, 2001.
PCT/CA 00/00937, International Search Report, 4 pages, Aug. 27, 2001.
Sally Floyd and Van Jacobson, "Link–Sharing and Resource Management Models for Packet Networks," IEEE/ACM Transactions on Networking, vol. 3, No. 4, pp. 365–386, Aug., 1995.
Laksham, T.V., et al., "High–Speed Policy–Based Packet Forwarding Using Efficient Multi–Dimensional Range Matching," Computer Communications Review, Association for Computing Machinery, New York, US, vol. 28, No. 4, Oct. 1998, pp. 203–214, XP000914436.
Bennett, Jon C.R. and Hui Zhang. *Hierarchical Packet Fair Queueing Algorithms*. IEEE/ACM, Trans on Networking, 5(5), 1997.

* cited by examiner

*Primary Examiner*—Hassan Kizou
*Assistant Examiner*—Dmitry Levitan
(74) *Attorney, Agent, or Firm*—Blakely, Sokoloff, Taylor & Zafman (57) ABSTRACT

Providing different levels of quality of service for different data flows being transported over a data link requires a very fast way to classify individual packets. Providing meaningful classification generally requires classifying data packets in several dimensions. A classification method represents a rule base as a hierarchy of linked tables and sequentially matches each parameter value in a packet signature against tables in the hierarchy. The method supports longest prefix matching and avoids time consuming backtracking by adding rules to the rule base.

18 Claims, 9 Drawing Sheets

METHODS AND APPARATUS FOR PACKET CLASSIFICATION WITH MULTI-LEVEL DATA STRUCTURE

CROSS REFERENCE TO RELATED APPLICATIONS

This application claims priority from U.S. provisional application No. 60/118,156 filed Feb. 1, 1999 which is entitled PACKET CLASSIFICATION METHODS AND APPARATUS, METHODS AND APPARATUS FOR DEPLOYING QUALITY OF SERVICE POLICIES ON A DATA COMMUNICATION NETWORK AND PACKET SCHEDULING METHODS AND APPARATUS.

FIELD OF THE INVENTION

This invention relates to the transmission of information, which may include voice data and video data, over computer networks. More specifically, this invention relates to methods and apparatus for classifying data packets. The classification methods and apparatus may be used in systems for providing a plurality of different levels of service each providing a different level of quality of service over wide area networks or other computer networks. The classification methods and apparatus have particular application in Internet Protocol ("IP") networks.

BACKGROUND OF THE INVENTION

Maintaining efficient flow of information over data communication networks is becoming increasingly important in today's economy. Telecommunications networks are evolving toward a connectionless model from a model whereby the networks provide end-to-end connections between specific points. In a network which establishes specific end-to-end connections to service the needs of individual applications the individual connections can be tailored to provide a desired bandwidth for communications between the end points of the connections. This is not possible in a connectionless network. The connectionless model is desirable because it saves the overhead implicit in setting up connections between pairs of endpoints and also provides opportunities for making more efficient use of the network infrastructure through statistical gains. Many networks today provide connectionless routing of data packets, such as Internet Protocol ("IP") data packets over a network which includes end-to-end connections for carrying data packets between certain parts of the network. The end-to-end connections may be provided by technologies such as Asynchronous Transfer Mode ("ATM"), Time Division Multiplexing ("TDM") and SONET/SDH.

A Wide Area Network ("WAN") is an example of a network in which the methods of the invention may be applied. WANs are used to provide interconnections capable of carrying many different types of data between geographically separated nodes. For example, the same WAN may be used to transmit video images, voice conversations, e-mail messages, data to and from database servers, and so on. Some of these services place different requirements on the WAN.

For example, transmitting a video signal for a video conference requires fairly large bandwidth, short delay (or "latency"), small delay jitter, and reasonably small data loss ratio. On the other hand, transmitting e-mail messages or application data can generally be done with lower bandwidth but can tolerate no data loss. Further, it is not usually critical that e-mail be delivered instantly. E-mail services can usually tolerate longer latencies and lower bandwidth than other services.

A typical WAN comprises a shared network which is connected by access links to two or more geographically separated customer premises. Each of the customer premises may include one or more devices connected to the network. More typically each customer premise has a number of computers connected to a local area network ("LAN"). The LAN is connected to the WAN access link at a service point. The service point is generally at a "demarcation" unit or "interface device" which collects data packets from the LAN which are destined for transmission over the WAN and sends those packets across the access link. The demarcation unit also receives data packets coming from the WAN across the access link and forwards those data packets to destinations on the LAN.

Currently an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application.

As noted above, guaranteeing the Quality of Service ("QoS") needed by applications which require low latency is typically done by dedicating end-to-end connection-oriented links to each application. This tends to result in an inefficient allocation of bandwidth. Network resources which are committed to a specific link are not readily shared, even if there are times when the link is not using all of the resources which have been allocated to it. Thus committing resources to specific end-to-end links reduces or eliminates the ability to achieve statistical gains. Statistical gains arise from the fact that it is very unlikely that every application on a network will be generating a maximum amount of network traffic at the same time.

If applications are not provided with dedicated end-to-end connections but share bandwidth then each application can, in theory, share equally in the available bandwidth. In practice, however, the amount of bandwidth available to each application depends on things such as router configuration, the location(s) where data for each application enters the network, the speeds at which the application can generate the data that it wishes to transmit on the network and so on. The result is that bandwidth may be allocated in a manner that bears no relationship to the requirements of individual applications or to the relative importance of the applications. There are similar inequities in the latencies in the delivery of data packets over the network.

The term Quality of Service ("QoS") is used in various different ways by different authors. In general, QoS refers to a set of parameters which describe the required traffic characteristics of a data connection. In this specification the term QoS refers to a set of one or more of the following interrelated parameters which describe the way that a data connection treats data packets generated by an application:

Minimum Bandwidth—a minimum rate at which a data connection must be capable of forwarding data originating from the application. The data connection might be incapable of forwarding data at a rate faster than the minimum bandwidth but should always be capable of forwarding data at a rate equal to the rate specified by the minimum bandwidth;

Maximum Delay—a maximum time taken for data from an application to completely traverse the data connection. QoS requirements are met only if data packets traverse the data connection in a time equal to or shorter than the maximum delay;

Maximum Loss—a maximum fraction of data packets from the application which may not be successfully transmitted across the data connection; and, Jitter—a measure of how much variation there is in the delay experienced by different packets from the application being transmitted across the data connection. In an ideal case where all packets take exactly the same amount of time to traverse the data connection the jitter is zero. Jitter may be defined, for example, as any one of various statistical measures of the width of a distribution function which expresses the probability that a packet will experience a particular delay in traversing the data connection. Different applications require different levels of QoS.

Recent developments in core switches for WANs have made it possible to construct WANs capable of quickly and efficiently transmitting vast amounts of data. There is a need for a way to provide network users with control over the QoS provided to different data services which may be provided over the same network.

Service providers who provide access to WANs wish to provide their customers with Service Level Agreements rather than raw bandwidth. This will permit the service providers to take advantage of statistical gain to more efficiently use the network infrastructure while maintaining levels of QoS that customers require. To do this, the service providers need a way to manage and track usage of these different services. There is a particular need for relatively inexpensive apparatus and methods for facilitating the provision of services which take advantage of different levels of QoS.

Applications connected to a network generate packets of data for transmission on the network. In providing different levels of service it is necessary to be able to sort or "classify" data packets from one or more applications into different classes which will be accorded different levels of service. The data packets can then be transmitted in a way which maintains the required QoS for each application. Data packets generated by one or more applications may belong to the same class.

Classifying data packets should be done extremely quickly, preferably at "wire speed" if the classification information is to be used to provide priority to data packets which require low latency. Currently available apparatus which can classify data packets at the wire speeds currently achievable is too expensive for widespread implementation. There is also a particular need for apparatus for classifying data packets which can be readily remotely configured and which is scalable.

SUMMARY OF THE INVENTION

This invention provides methods and apparatus for packet classification. The methods and apparatus use multi-level data structures which have one level corresponding to each parameter value in a packet signature. Each level of the data structure contains conditions which may be matched by corresponding parameter values in the packet signature. The methods search for conditions which match the corresponding parameter value of the packet being classified. In preferred embodiments, different search engines may be used to search for matching conditions in different levels. The methods of the invention can provide fast classification.

One embodiment of the invention provides a method for classifying data packets. The method includes providing a set of packet classification rules embodied in a plurality of lookup tables. The lookup tables include a first table containing conditions on a first parameter and one or more subsequent tables linked to the first table and containing conditions on one or more corresponding subsequent parameters. The rules define a plurality of classes. The invention can identify a class corresponding to a packet and the class information may then be used to schedule the dispatch of the packet according to the QoS requirements of the class to which the packet belongs.

The method includes reading a signature comprising values for a plurality of parameters of an incoming data packet and identifying one of the subsequent tables by searching the first table for a match between one of the conditions and a first parameter value of the signature. The method continues by sequentially searching identified subsequent tables for conditions matching subsequent parameter values, each time obtaining a pointer identifying a next one of the subsequent lookup tables. The method then searches a final one of the subsequent tables for a match to a final parameter value and obtaining a class identifier corresponding to a matched rule.

Preferably, whenever a table contains two or more different conditions which could be simultaneously matched by a parameter value and a first one of the two or more conditions has a higher precedence than a second one of the two or more conditions, a next level one of the tables corresponding to the first one of the two or more conditions duplicates one or more entries of a next level one of the tables corresponding to the second one of the two or more conditions. This reduces the need for backtracking. Most preferably very next level one of the tables corresponding to the first one of the two or more conditions duplicates all entries of a next level one of the tables corresponding to the second one of the two or more conditions. This eliminates the need for backtracking.

The invention also provides apparatus for classifying data packets according to the invention. Further aspects and benefits of the invention are described below.

BRIEF DESCRIPTION OF THE DRAWINGS

In the attached drawings which illustrate non-limiting embodiments of the invention.

DETAILED DESCRIPTION

This invention relates to classification of data packets. The invention may be applied in any situation where it is necessary to classify data packets. The invention may be applied, for example, in packet forwarders, routers, firewalls, statistics collectors or other packet handling devices on a network. The invention has particular application in situations where it is necessary or desirable to classify packets very quickly. The following description describes the application of the invention in devices which connect a LAN to a WAN but the invention is not limited to such devices.

Figure 1:
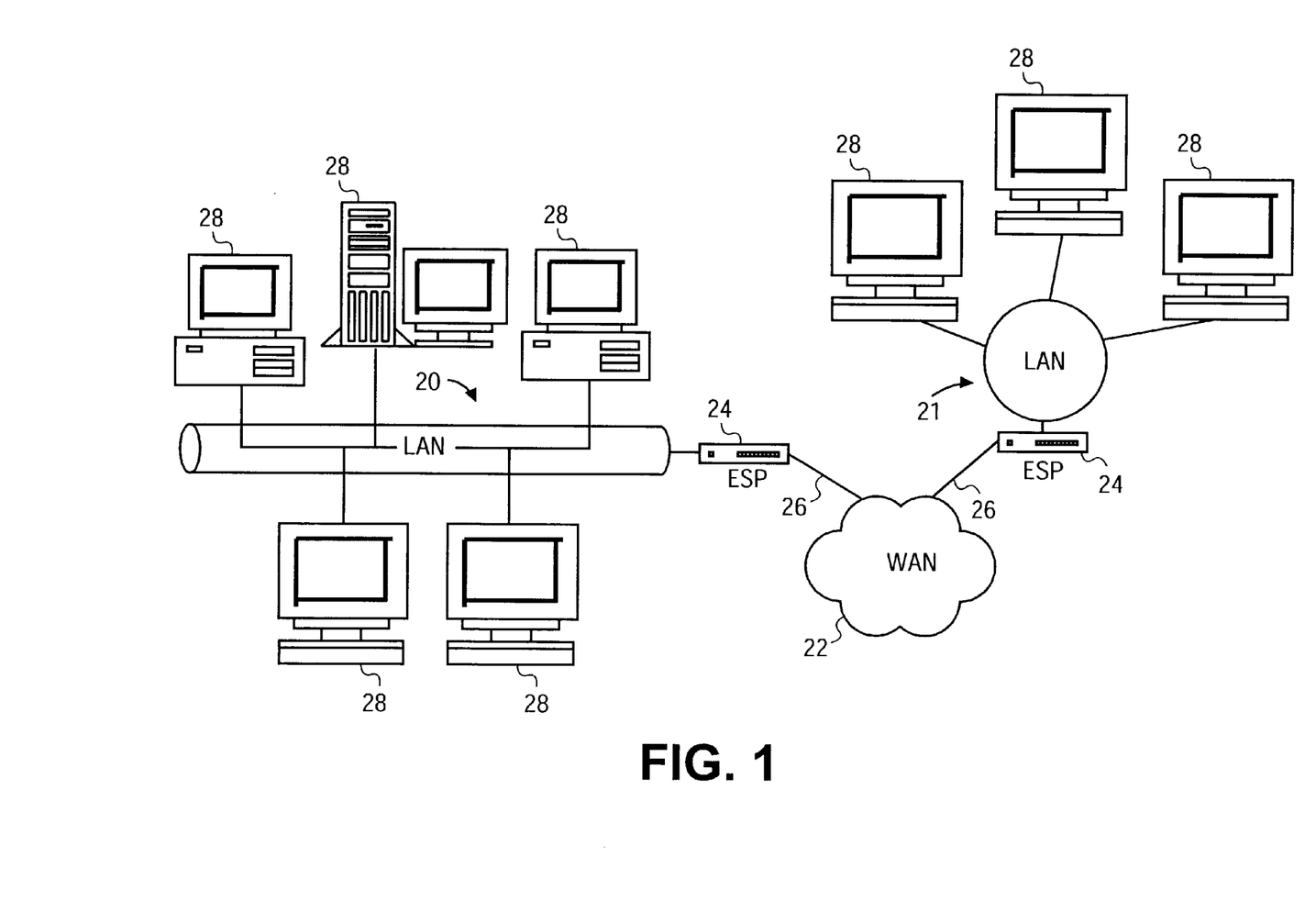
FIG. 1 is a schematic view of a wide area network according to the invention which comprises enterprise service point ("ESP") devices according to the invention.

FIG. 1 shows a generalized view of a pair of LANs 20, 21 connected by a WAN 22. Each LAN 20, 21 has an Enterprise Service Point unit ("ESP") 24 which connects LANs 20, 21 to WAN 22 via an access link 26. LAN 20 may, for example, be an Ethernet network, a token ring network or some other computer installation. Access link 26 may, for example, be an Asynchronous Transfer Mode ("ATM") link. Each LAN has a number of connected devices 28 which are capable of generating and/or receiving data for transmission on the LAN. Devices 28 typically include network connected computers.

Figure 2:
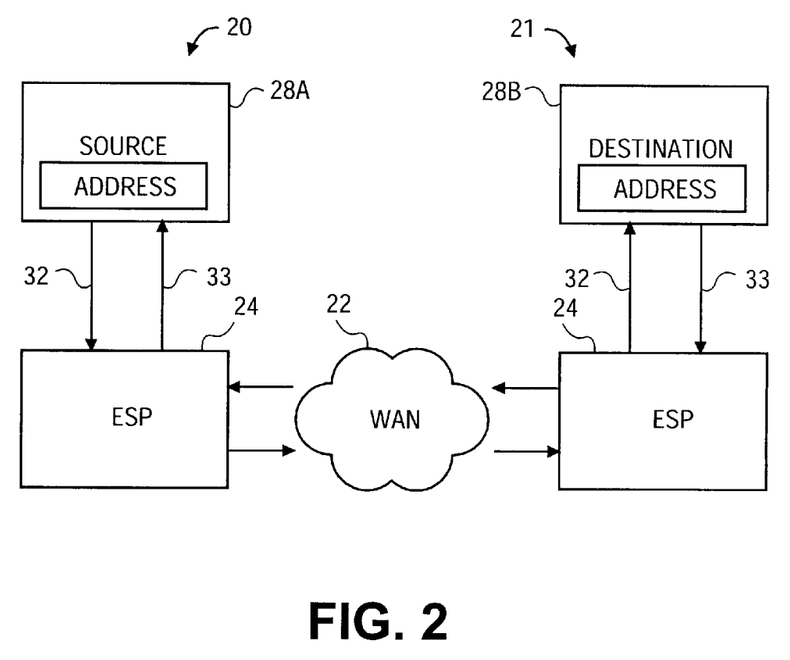
FIG. 2 is a schematic view illustrating two flows in a communications network according to the invention.

As required, various devices 28 on network 20 may establish data connections with devices 28 of network 21 over WAN 22 and vice versa. A single device may be running one or more applications which each may maintain unidirectional or bi-directional connections to applications on another device 28. Each connection may be called a session. Each session comprises one or more flows. Each flow is a stream of data from a particular source to a particular destination. For example, FIG. 2 illustrates a session between a computer 28A on network 20 and a computer 28B on network 21. The session comprises two flows 32 and 33. Flow 32 originates at computer 28A and goes to computer 28B through WAN 22. Flow 33 originates at computer 28B and goes to computer 28A over WAN 22. Most typically data in a great number of flows will be passing through each ESP 24 in any period. ESP 24 manages the outgoing flow of data through at least one port and typically through each of two or more ports.

Each flow consists of a series of data packets. In general the data packets may have different sizes. Each packet comprises a header portion which contains information about the packet and a payload or datagram. For example, the packets may be Internet protocol ("IP") packets.

Figure 3:
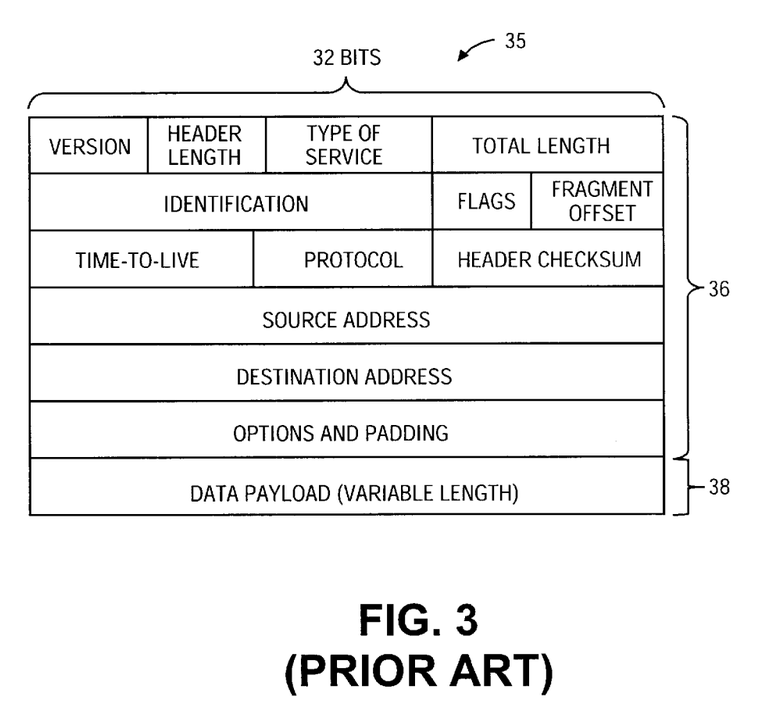
FIG. 3 is a diagram illustrating the various data fields in a prior art IP v4 data packet.

FIG. 3 illustrates the format of an IP packet 35 according to the currently implemented IP version 4. Packet 35 has a header 36 and a data payload 38. The header contains several fields. The "version" field contains an integer which identifies the version of IP being used. The current IP version is version 4. The "header length" field contains an integer which indicates the length of header 36 in 32 bit words. The "Type of Service" field contains a number which can be used to indicate a level of Quality of Service required by the packet. The "total length" field specifies the total length of packet 35. The "identification" field contains a number which identifies the data in payload 38. This field is used to assemble the fragments of a datagram which has been broken into two or more packets. The "flags" field contains 3-bits which are used to determine whether the packet can be fragmented. The "time-to-live" field contains a number which is decremented as the packet is forwarded. When this number reaches zero the packet may be discarded. The "protocol" field indicates which upper layer protocol applies to packet 35. The "header checksum" field contains a checksum which can be used to verify the integrity of header 36. The "source address" field contains the IP address of the sending node. The "destination address" field contains the IP address of the destination node. The "options" field may contain information related to packet 35.

Each ESP 24 receives streams of packets from its associated LAN and from WAN 22. These packets typically belong to at least several different flows. The combined bandwidth of the input ports of an ESP 24 is typically greater than the bandwidth of any single output port of ESP 24. Therefore, ESP 24 typically represents a queuing point where packets belonging to various flows may become backlogged while waiting to be transmitted through a port of ESP 24. Backlogs may occur at any output port of ESP 24. While this invention is preferably used to manage the scheduling of packets at all output ports of ESP 24, the invention could be used at any one or more output ports of ESP 24.

For example, if the output port which connects ESP 24 to WAN 22 is backlogged then ESP 24 must determine which packets to send over access link 26, in which order, to make the best use of the bandwidth available in access link 26 and to provide desired levels of QoS to individual flows. To do this, ESP 24 must be able to classify each packet, as it arrives, according to certain rules. ESP 24 can then identify those packets which are to be given priority access to link 26. After the packets are classified they can be scheduled for transmission. Typically, all packets in the same flow are classified in the same class.

Packets must be classified extremely quickly. For example, a delay of much more than 150 milliseconds is unacceptable for two-way voice conversations. If classifying and scheduling a packet takes 1 millisecond then at most 1000 packets can be forwarded per second (if the classification and scheduling is done sequentially). If each packet is 40 bytes long then the maximum throughput is only 320 Kbps. To support high speed links such as OC3, it should not take more than 2 microseconds to classify and schedule each packet. It preferably takes only about 1 microsecond to process each packet. This invention provides methods and apparatus for classifying packets received at an ESP 24 or other queuing point in a data connection.

Figure 4:
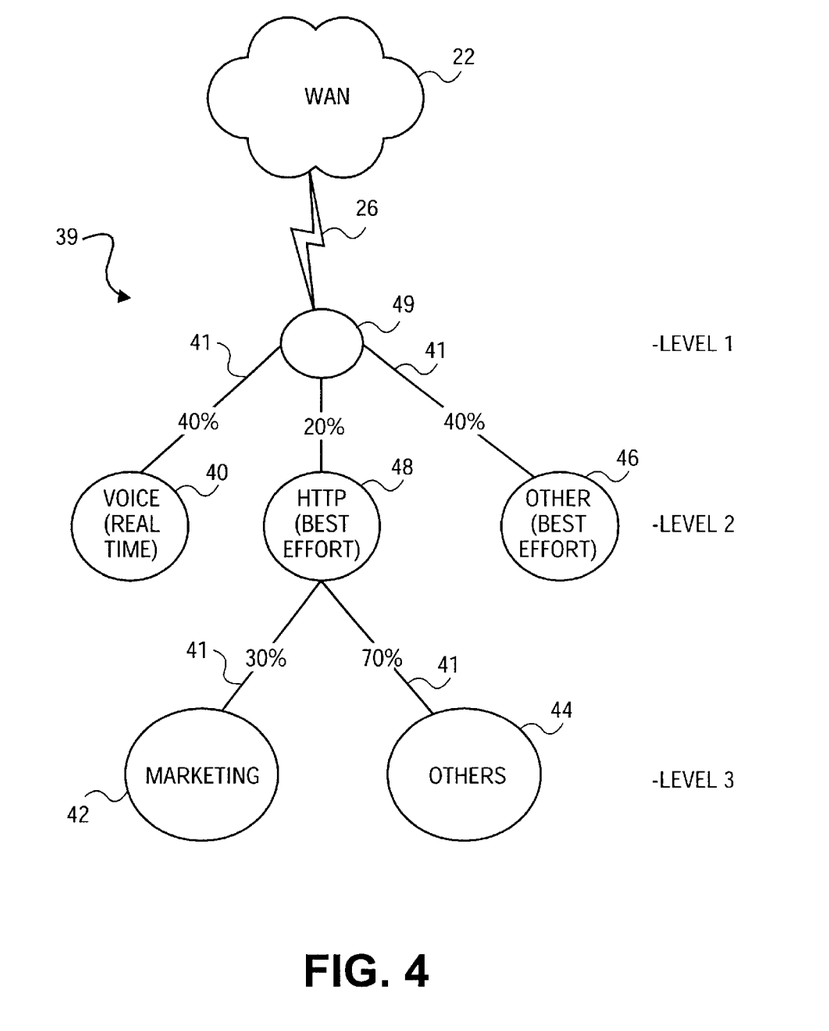
FIG. 4 is a schematic view showing an example of a policy which may be implemented with the methods and apparatus of the invention.

Incoming packets are sorted into classes according to a policy which includes a set of rules. For each class, the rules specify the attributes which a data packet must possess for the data packet to belong to the class. The policy preferably also establishes QoS levels for the different classes. FIG. 4 schematically illustrates one possible policy 39. Policy 39 is specified in the form of a "policy tree" or "classification tree" for each output port of ESP 24 (an ESP 24 may have several separate output ports). The tree has a number of leaf nodes 40, 42, 44, 46. Each leaf node corresponds to a class. Each class may be treated differently in order to provide guaranteed levels of QoS to selected applications. At any given time, ESP 24 may be holding zero, one, or more packets belonging to each class. The packets in a class may belong to zero, one, or more flows. Non-leaf nodes of policy tree 39 may also be called "classes" although the classes into which packets are initially classified correspond to leaf classes of policy tree 39.

In the example of FIG. 4, a class 40 contains voice traffic. Class 40 may be termed a "real time" class because it is important to deliver packets in class 40 quickly enough to allow a voice conversation. Packets in class 40 will be scheduled so that each flow in class 40 will be guaranteed a level of QoS sufficient for voice communication including sufficient bandwidth to support a real time voice session. Class 40 is entitled to at least 40% of the bandwidth available. The number of simultaneous flows in class 40 may be limited to a maximum value so that each flow will be guaranteed sufficient bandwidth to support a real time voice conversation.

Classes 42 and 44 contain flows of Hyper Text Transfer Protocol ("HTTP") sessions. Class 42 contains HTTP flows which originate in MARKETING. MARKETING may be, for example, sources 28 associated with a company's marketing department. Other HTTP flows fall into class 44. As indicated at 48, in the policy of FIG. 4, classes 42 and 44 will share between themselves at least 20% of the bandwidth available. The other 40% of the bandwidth is allocated to class 46 which covers all other flows. Of the bandwidth shared by classes 42 and 44, at least 30% is allocated to class 42 and at least 70% is allocated to class 44. The actual bandwidth available at a node may be greater than the minimum bandwidth allocated by policy 39. For example, packets coming through node 42 may enjoy more than 30% of the bandwidth of node 48 which is shared between nodes 42 and 44 if there is no backlog of packets at node 44 (i.e. node 44 is not using all of the minimum bandwidth to which it is entitled). If, for example, at some time there are no packets for transmission which are associated with node 44 then all of the bandwidth shared by nodes 42 and 44 is available to packets associated with node 42.

As each new packet arrives at ESP 24 from LAN 20 the new packet is classified. Classification involves extracting information intrinsic to a packet such as the source address, destination address, protocol, and so on. Classification may also involve information external to the data packets such as the time of day, day of week, week of the year, special calendar date and the port at which the packet arrives at ESP 24. This information, which comprises a set of parameters for each packet, is used to classify the packet according to a set of rules.

In preferred embodiments of the invention ESP 24 reads some or all of the following information from each IP packet:

1. input port on which packet arrived at ESP 24;
2. source IP address (src);
3. destination IP address (dst);
4. source User Datagram Protocol (UDP) or Transmission Control Protocol (TCP) port number (sport);
5. destination UDP or TCP port number (dport);
6. layer 3 packet type (in a typical embodiment the layer 3 packet type may be one of: IP, Address Resolution Protocol/Reverse Address Resolution Protocol (ARP/RARP), Internetwork Packet Exchange/Sequenced Packet Exchange (IPX/SPX), or Ethertalk) this parameter is not useful if only one protocol, such as only IP, is being used;
7. type of service ("TOS") value (tos);
8. layer 4 packet type (in a typical embodiment the layer 4 packet type may be one of: TCP or UDP)
9. TCP acknowledgement flag; and,
10. ack bit.

Preferably ESP 24 also tracks the time the packet arrives at ESP 24 relative to some reference time (for example, the time may be expressed in milliseconds since epoch—midnight GMT on Jan. 1, 1970). These 11 parameters, a subset of these parameters, or a combination of these parameters with other parameters can be used to classify each new packet according to rules in a set of rules, which may be called a rule base. The parameters used for classification could even include fields inside a TCP/UDP packet header or information in the data being carried by the packet. The set of parameter values used to classify each packet may be termed a "signature" for that packet.

The inventors have found that for classifying IP packets the following 9 parameters are particularly useful: input port; source IP address; destination IP address; source TCP/UDP port number; destination TCP/UDP port number; type of service; layer 4 packet type; ack bit; and, time of arrival.

According to the preferred embodiment of the invention, each rule is of the form:

CLASS M: parameter 1=condition to be satisfied by parameter 1;

parameter 2=condition to be satisfied by parameter 2;

parameter 3=condition to be satisfied by parameter 3;

. . .

parameter N=condition to be satisfied by parameter N.

A packet belongs to class M if every parameter value in the packet's signature matches the corresponding condition specified by the rule. The condition may be that the parameter value be the same as a particular value, that the parameter value be one of a number of specified values or that the parameter value be within a range of values specified in the class definition rule.

Some classes may be "active" only during certain time periods. In this case packets may be classified in a class only if the class is active. The time of arrival of a packet can be compared to the class schedule to determine whether the class is active.

For some parameters some rules' conditions may be satisfied by any value for the parameter (i.e. the rule's condition for that parameter is a "wild card"). N is the dimensionality of the rule. For example, if there are 9 parameters used to classify packets the classification is a 9-dimensional classification. A problem in quickly classifying packets using multi-dimensional lookups is that it is very difficult to do a multi-dimensional lookup very fast, as is required, with apparatus that is reasonably affordable. In this preferred embodiment of the invention one or more rules corresponds to a class on policy tree 39.

In general, the signature for a packet may satisfy more than one rule. For example, one rule might provide that packets having a source address in a range which has been assigned to a particular department should be classified in one class. A second rule might specify that packets having a source address identifying a particular computer within the department should be classified in a different class. A packet originating at the particular computer would satisfy both rules simultaneously and would therefore fall within two different classes. However, the classification must be unique.

To avoid allowing packets to be classified in two different classes at the same time, specific rules can be given precedence over general rules. In one dimensional IP routing tables it is known to use longest prefix matching to specify which rules take precedence over other rules. When longest prefix matching is being used, a rule whose src or dst values are matched by a packet has precedence over other rules if its src or dst values are the longest matches for that packet. For example, if the following two one-dimensional rules exist:

class c: src=11010110.*.*.*.

class d: src=11010110.01110110.*.*.

(where an asterisk "*" indicates a wild card match such that any bit values will match the asterisk) then a packet having a source address of 11010110.01110110.10100000.01011101 should be classified in class d since class d matches the first 16 bits of the packet's source address while class c matches only the first 8 bits of the packet's source address.

According to one embodiment of the invention, classification begins by looking up the value of a first parameter from the signature of a data packet. This lookup can be done in a first table. The table includes a pointer which identifies one of a number of second level tables to be used for looking up the value of the second parameter in the packet's signature, and so on. Ultimately the method identifies a final level table in which the classification for the packet can be looked up using the value of a final parameter in the packet's signature.

Any suitable search hardware or hardware/software search engine may be used to implement this embodiment of the invention. Suitable search engines are well known to those skilled in the art and will therefore not be described here. A suitable search engine, may, for example, be implemented in software running on a general purpose computer processor or on a Digital Signal Processor ("DSP").

Figure 5:
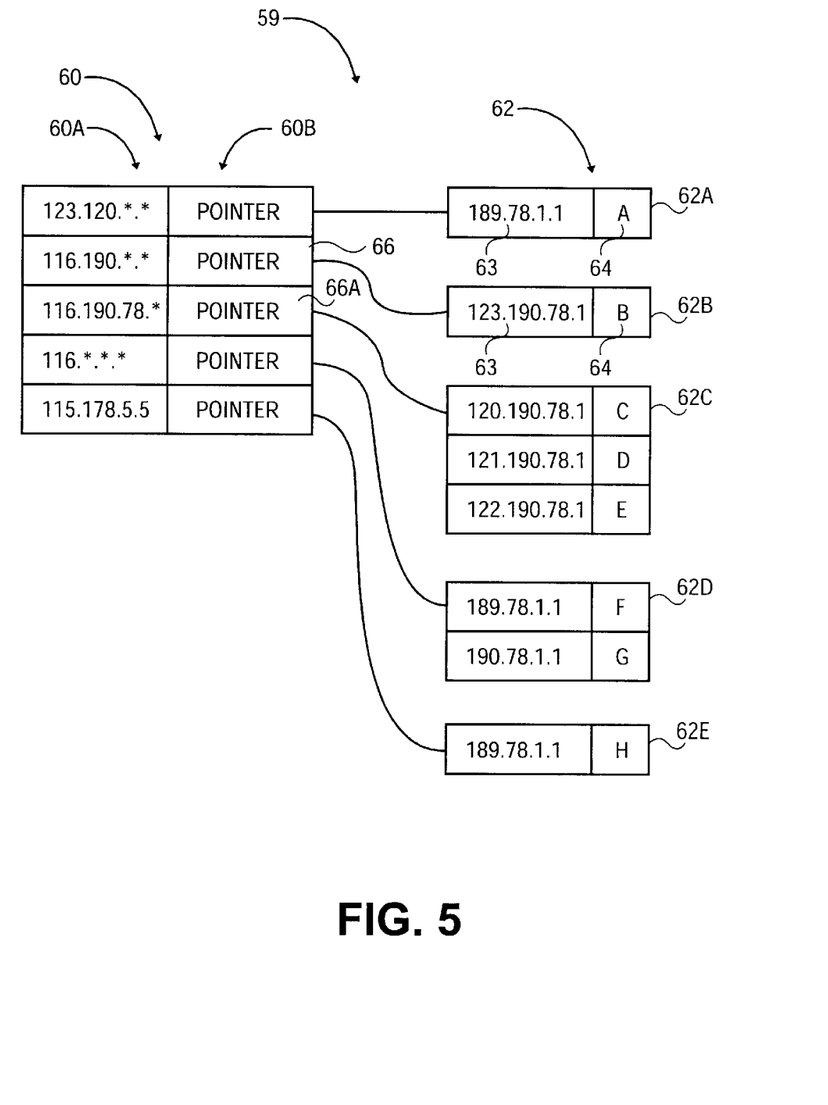
FIG. 5 is a schematic diagram which illustrates a data structure for use in implementing the invention.

FIG. 5 illustrates a data structure 59 which may be provided in a memory within ESP 24 for the practice of this embodiment of the invention. Data structure 59 corresponds to a 2-dimensional classification scheme which includes the 8 rules listed in Table I. Data structure 59 has N levels of tables (N=2 in the example of FIG. 5). One level of tables corresponds to each parameter value in the signature of a packet. A first level table 60 corresponds to the first parameter value. One or more second level tables 62 correspond to the second parameter value, and so on.

TABLE I

Example Rules

| | |
|---|---|
| Class A: | src = 123.120.*.*; dst = 189.78.1.1 |
| Class B: | src = 116.190.*.*; dst = 123.190.78 1 |
| Class C: | src = 116.190.78.*; dst = 120.190.78.1 |
| Class D: | src = 116.190.78.*; dst = 121.190.78.1 |
| Class E: | src = 116.190.78 *; dst = 122.190.78.1 |
| Class F: | src = 116.*.*.*; dst = 189.78.1.1 |
| Class G: | src = 116.*.*.*; dst = 190.78.1.1 |
| Class H: | src = 115.178.5.5; dst = 189.78.1.1 |

Figure 6:
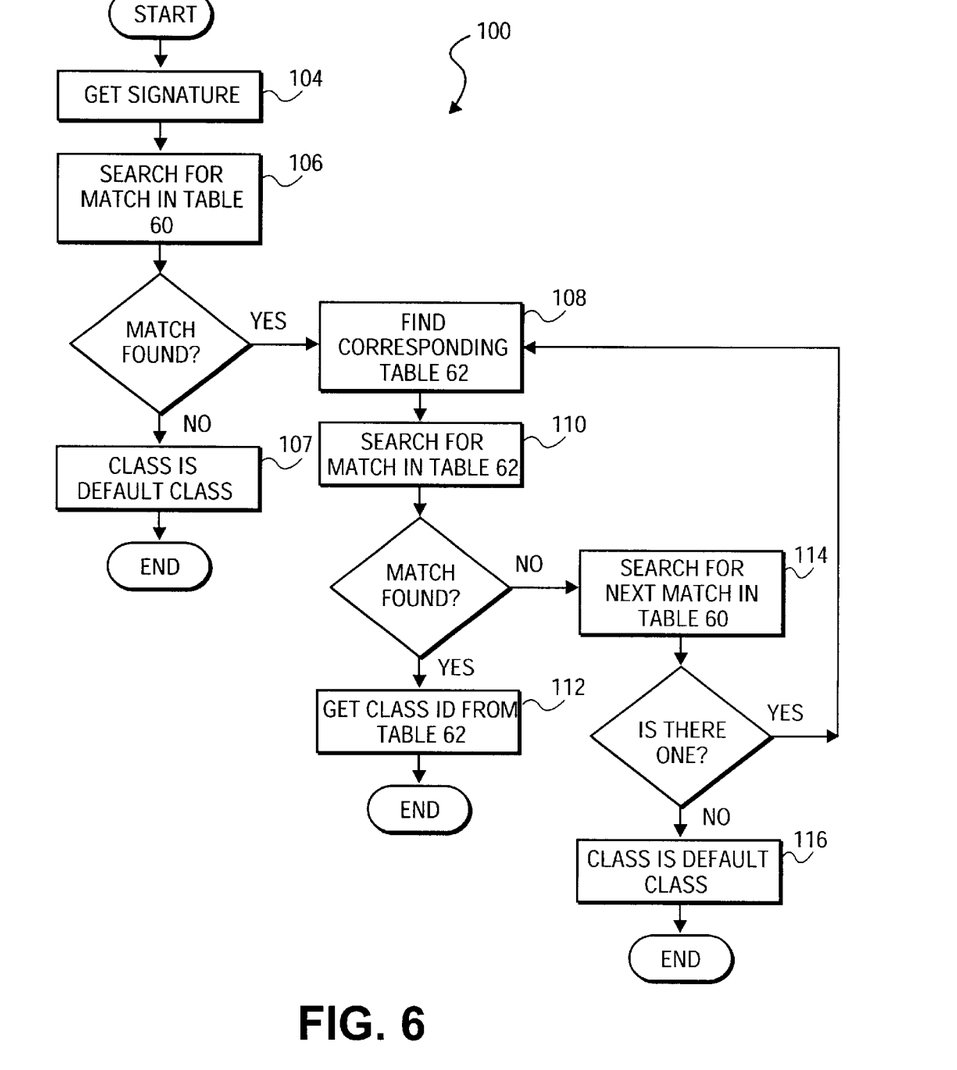
FIG. 6 is a flow chart illustrating the method of the invention.

The method 100 of this embodiment of the invention is illustrated in FIG. 6. When a data packet arrives at ESP 24, its signature is extracted (step 104). In this example case the signature includes only two parameters, src and dst although, in general the signature could include two or more parameter values. First the value of the first parameter, for example, src is looked up in first level table 60 (step 106). Each row of table 60 includes a distinct condition 60A for the first dimension, src and a pointer 60B to one of five second level tables 62. When the appropriate one of second level tables 62 is located (i.e. when a second level table is found which is pointed to by the pointer in a row of table 60 which has a condition matching the value of the first parameter in the signature of the packet) (step 108)then the value for the second parameter, in this case dst, is looked up in the second level table 62 (step 110).

Each row of each second level table 62 includes a condition 63 to be matched by the second dimension, dst, and a value 64 indicating the class in which the packet is classified when the corresponding condition is satisfied. When a matching entry in the table 62 is found (step 112) then the classification of the packet has been found. If there are no matches to the first parameter in table 60 then the packet is classified in a default class (step 107).

There will typically be a great many rules. Various search algorithms may be used to find the rules in each table which match the parameter values in the signature of a packet. For example, a binary digital tree search, a Patricia trie search, or a binary search of hash tables may be used for searching. Those skilled in the art will know of various other search algorithms which may be suitable for use with this invention. It is not necessary to use the same search algorithm for every level of tables. The invention permits a different search engine or algorithm to be used for each level of tables. For example, various search algorithms are known in the art which are particularly effective at finding an entry which matches an IP address. Such algorithms may be used to advantage for levels corresponding to src or dst parameters. Other algorithms may be used in other levels to find conditions which match other parameters.

If the classification rules in Table I had more than 2 dimensions then second level tables 62 would include pointers to third level tables to be used for looking up the values of a third parameter in each packet's signature instead of values identifying classes. The tables in each level would include pointers to subsequent level tables. A final level of tables would include classifications instead of pointers to other tables.

Longest prefix matching may be used to find the best match for some parameter values. Typically longest prefix matching is used only for IP addresses, such as src and dst. In preferred embodiments, looking up the src and dst parameters includes performing longest prefix matching to find the entry in the corresponding table which matches the largest number of the most significant bits of the src and dst values in the packet's signature.

For example, with the data structure 59 of FIG. 5, a packet having the signature src=116.190.79.2 dst=123.190.78.1 would be classified in class B. A processor in ESP 24 first searches the entries in first level table 60 for an entry which matches the src value 116.190.79.2. There are two such entries, 116.190.*.* and 116.*.*.*.116.190.*.*. is selected because it matches 16 bits of 116.190.79.2 whereas 116.*.*.* matches only the first 8 bits of 116.190.79.2. Table 60 has a pointer 66 corresponding to the entry or 116.190.*.*. which points to the second level table 62B. In this case, because there are only two levels of tables in data structure 59, table 62B is both a subsequent level table and a final level table. The dst value, 123.190.78.1 is then compared to the entries in table 62B. In the example, table 62B has the single entry 123.190.78.1. This entry matches the dst value for the packet in question. Therefore the packet is classified in class B. A value representing class B can then be passed to the part of ESP 24 which will schedule the transmission of the packet.

A first disadvantage of this method as described so far is that the rule having a first condition which best matches a first dimension of a packet signature may fail to be matched in subsequent dimensions. Consider, for example a packet having the signature src=116.190.78.2 dst=123.190.78.1. It can be seen that this packet should be classified in class B. As in the example above, a search of table 60 will yield a pointer 66A to table 62C. Table 62C has no match to the dst value dst=123.190.78.1. To find the correct rule, therefore it is necessary to backtrack. In this example, having found no match in table 62C, ESP 24 must go back to table 60 (FIG. 6, step 114) and select another entry which matches the src value in question but is not the longest prefix match (FIG. 6, step 114). For example, ESP 24 must find the second longest matching prefix.

In this case the second longest matching prefix is 116.190.*.*. The pointer in table 60 which corresponds to the entry 116.190.*.* points to table 62B. ESP 24 then finds and searches table 62B (steps 108, 110) and finds a match for the dst value dst=123.190.78.1. Table 62B identifies the applicable class as being class B. If, upon backtracking, there had been no next match in table 60 then the packet would have been identified as belonging to a default class (step 116).

Backtracking multiplies the time taken to classify a packet and is therefore highly undesirable. Where there are 3 or more dimensions to search backtracking can be particularly time consuming. While the examples above are trivial in that each table contains no more than a few entries, in practice each table in data structure 59 will typically have hundreds or thousands of entries.

The inventors have developed an inventive improved method for classifying packets which completely avoids the need for backtracking and therefore dramatically reduces the time taken to completely classify an incoming packet. The improved method comprises obtaining a set of rules and constructing a data structure 59, as described above, for the set of rules. The data structure is prepared by creating in an electronically readable memory a hierarchy of tables having a level of tables for each dimension of the rules in the set of rules. Each distinct condition for a first one of the parameter values specified by the rules is written to a first level table.

Two or more different rules may specify the same distinct condition for the first parameter. The first table only needs one entry for each distinct condition on the first parameter. One second level table is created corresponding to each of the distinct conditions in the first level table. A pointer to each second level table is written in the corresponding entry of the first level table.

The process is repeated for the second and subsequent level tables. In each case only those rules are considered which share the entry in the next lower numbered level table that points to the table being constructed. Then an entry is created in the table being constructed for each distinct condition imposed by those rules on the value of the parameter which corresponds to the table. The number of distinct conditions will be equal to or less than the number of rules. Once again, in general, several rules may specify the same distinct condition on the parameter corresponding to the table being constructed. For example, several rules which use a second level or subsequent level table may all impose a wild card condition on the parameter value which corresponds to the table.

After data structure 59 has been created, or during the creation of data structure 59, the method adds entries to one or more of the tables in data structure 59 in a manner which reduces or eliminates the possibility that backtracking will need to be done to find a rule which matches a packet's signature.

Figure 7:
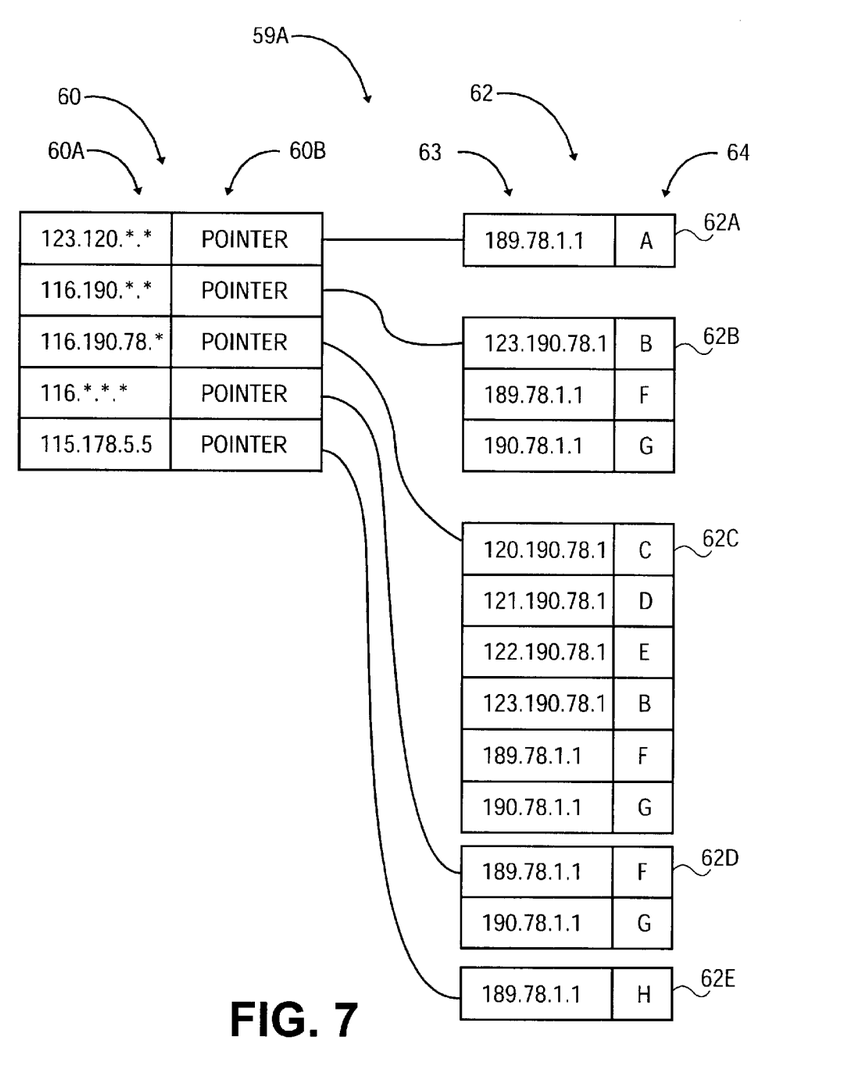
FIGS. 7 and 7A are schematic diagrams which illustrate data structures for use in implementing an improved version of the invention; and, FIG. 8 is a flow chart illustrating the method of the improved version of the invention.

In the two dimensional case illustrated by the above examples, the improved method involves adding entries to certain ones of tables 62A through 62E in data structure 59A as shown in FIG. 7. In each case where a parameter value could simultaneously match two or more of the distinct conditions 60A of table 60 there must be some criterion for selecting which one of the conditions takes precedence over the other so that classifications will be unique. The entries of the second level table 62 which correspond to the condition of lower precedence are duplicated in the table 62 which corresponds to the condition having higher precedence. For example, in the case of longest prefix matching, if table 60 includes a first condition which is a prefix of a second condition, then the entries of the second level table corresponding to the first (lower precedence) condition are duplicated in the second level table corresponding to the second (higher precedence) condition. This is equivalent to adding new rules to the rule base as shown in Table II.

TABLE II

Expanded Rule Set

| Class A: | src = 123.120.*.*; dst = 189.78.1.1 |
| Class B: | src = 116.190.78.*; dst = 123.190.78.1 |
| Class B: | src = 116.190.*.*; dst = 123.190.78.1 |
| Class C: | src = 116.190.78.*; dst = 120.190.78.1 |
| Class D: | src = 116.190.78.*; dst = 121.190.78.1 |
| Class E: | src = 116.190.78.*; dst = 122.190.78.1 |
| Class F: | src = 116.190.78.*; dst = 189.78.1.1 |
| Class F: | src = 116.190.*.*; dst = 189.78.1.1 |
| Class F: | src = 116.*.* *; dst = 189.78.1.1 |
| Class G: | src = 116.190.78.*; dst = 190.78.1.1 |
| Class G: | src = 116.190.*.*; dst = 190.78.1.1 |
| Class G: | src = 116.*.*.*.; dst = 190.78.1.1 |
| Class H: | src = 115.178.5.5; dst = 189.78.1.1 |

Figure 8:
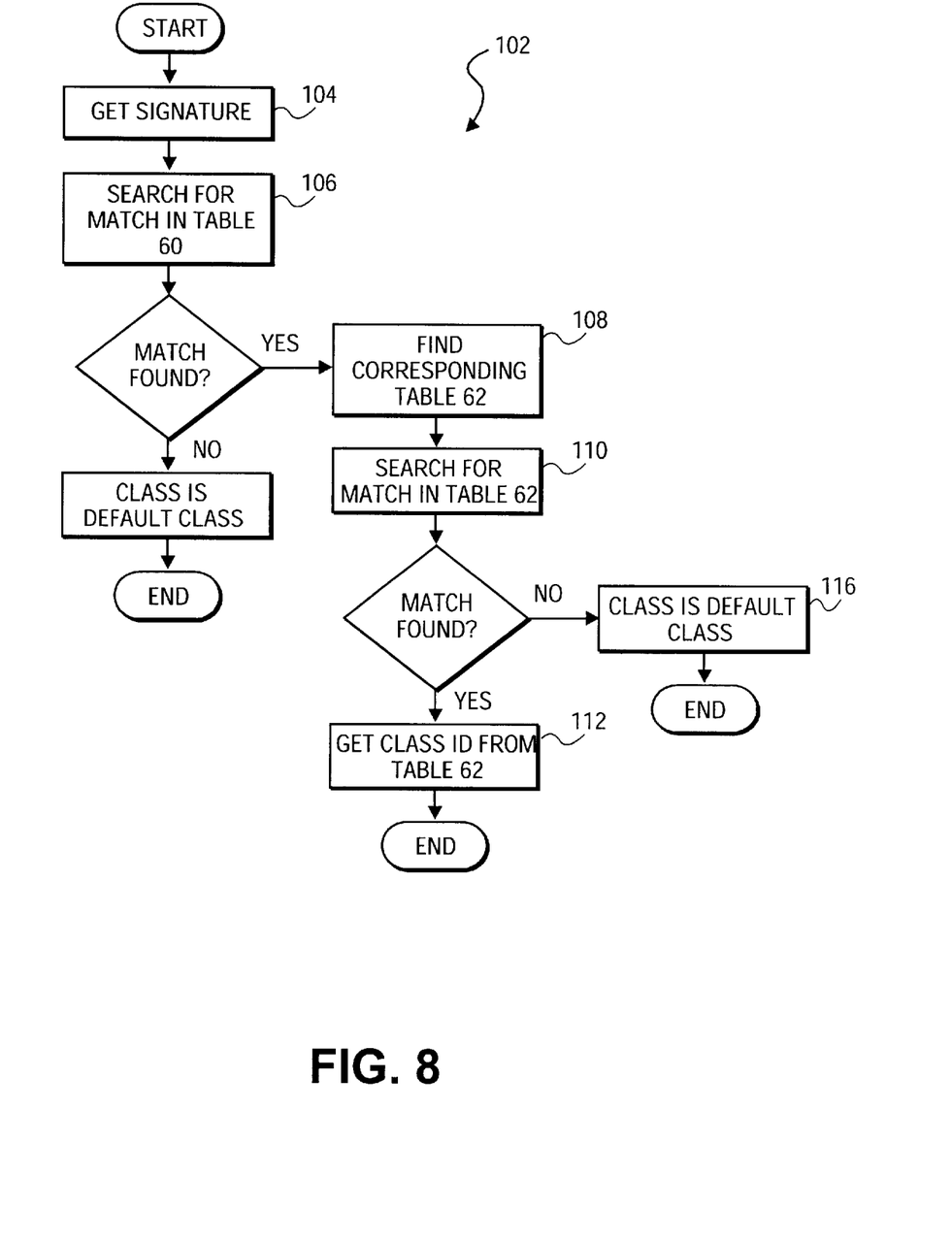

The result is a much simplified method 102 for classifying a packet as shown in FIG. 8. No backtracking is necessary.

If the rules include additional dimensions for which "best" matching is performed so that backtracking may become necessary then the rule base for the additional dimensions is preferably also expanded as set out above. "Best" matching occurs most often in the context of longest prefix matching which is typically performed only on IP addresses, such as src and dst. Best matching may also be used in cases where one rule specifies a wildcard, a set of parameter values, or a range of parameter values to match a parameter and another rule specifies a particular value to match the same parameter. A match to a single value is a "better match" than a match to one of a set of values. A match to one of a set of values is a better match than a match to a range of values. A match to a range of values is a better match than a match to a wildcard.

Figure 7A:
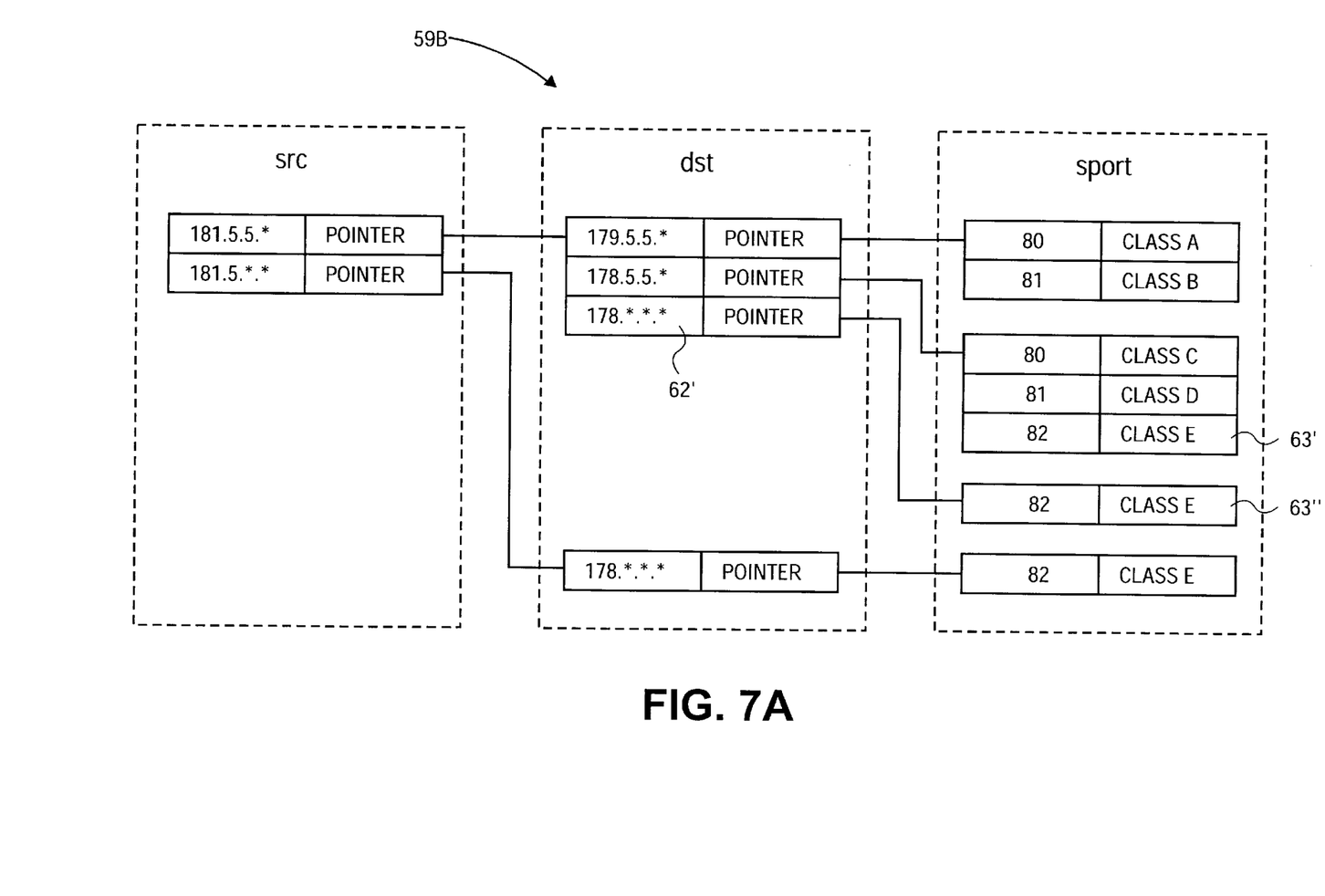

For example, the following set of rules may be expanded in both the src and dst dimensions to yield a data structure 59B as shown in FIG. 7A for which no backtracking is necessary although longest prefix matching is used on both the src and dst dimensions:

TABLE III

| Class A: | src = 181.5.5.*; dst = 179.5.5.*; sport = 80 |
| Class B: | src = 181.5.5.*; dst = 179.5.5.*; sport = 81 |
| Class C: | src = 181.5.5.*; dst = 178.5.5.*; sport = 80 |
| Class D: | src = 181.5.5.*; dst = 178.5.5.*; sport = 81 |
| Class E: | src = 181.5.*.*; dst = 178.*.*.*; sport = 82. |

It can be seen in the example of FIG. 7A that in addition to rows corresponding strictly to the rules of Table III a row 62' has been added to a second level table (for the dst dimension) and rows 63' and 63" have been added to third level tables (in the "sport" dimension). The addition of these rows provides a data structure 59B for which backtracking is unnecessary when the data structure is used according to the invention.

Once a packet has been classified then the classification information can be forwarded to a scheduler for use in scheduling the transmission of the packet. Scheduling may be performed, for example, in the manner described in the above-noted priority provisional application which is incorporated herein by reference or by some other scheduling method which dispatches packets according to their classification.

TABLE CONSTRUCTION

EXAMPLE 1

A first example of table construction uses a packet signature consisting of values for 3 parameters, src, dest, and sport. Longest prefix matching is performed on the src and dest parameters. To clarify this example, we can use the notation 123.*.*.* ⊂ 123.178.*.* to indicate that 123.*.*.* is a prefix of 123.178.*.*.

We provide a set of rules, or "rule base" as follows:

R1: Class A: src=123.120.*.*; dest=189.78.1.1, sport=10

R2: Class B: src=116.190.*.*; dest=123.190.78.1, sport=20

R3: Class C: src=116.190.78.*; dest=120.190.78.1, sport=30

R4: Class D: src=116.190.78.*; dest=121.190.78.1, sport=40

R5: Class E: src=116.190.78.*.; dest=122.190.78.1, sport=50

R6: Class F: src=116.*.*.*; dest=189.78.1.1, sport=60

R7: Class G: src=116.*.*.*; dest=122.190.*.*, sport=50

R8: Class H: src=115.178.5.5; dest=189.78.1.1, sport=70

R9: Class I: src=116.*.*.*; dest=123.190.78.*, sport=40

On the src dimension, 116.*.*.* ⊂ 116.190.*.* ⊂ 116.190.78.*. In this case we need to expand all rules with 116.*.*.* to rules with 116.190.*.* and 116.190.78.*, respectively. In particular we need to expand rules R6, R7, R2, and R9 to generate an expanded rule base. This can be done by adding new rules as follows. We expand R6: by adding R6' and R6" as follows:

R6: Class F: src=116.*.*.*; dest=189.78.1.1; sport=60

R6': Class F: src=116.190.*.*; dest=189.78.1.1; sport=60

R6": Class F: src=116.190.78.*; dest=189.78.1.1; sport=60

We expand R7: by adding R7' and R7" as follows:

R7: Class G: src=116.*.*.*; dest=122.190.*.*; sport=50

R7': Class G: src=116.190.*.*; dest=122.190.*.*; sport=50

R7": Class G: src=116.190.78.*; dest=122.190.*.*; sport=50

We expand R2: by adding R2' as follows:

R2: Class B: src=116.190.*.*; dest=123.190.78.1, sport=20

R2': Class B: src=116.190.78.*; dest=123.190.78.1, sport=20

We expand R9: by adding R9' and R9" as follows:

R9: Class I: src=116.*.*.*; dest=123.190.78.*, sport=40

R9': Class I: src=116.190.*.*; dest=123.190.78.*, sport=40

R9": Class I: src=116.190.78.*; dest=123.190.78.*, sport=40

After all these expansions we can build a first table in a data structure. In the first table, for each distinct src prefix condition in the rule base, we have an entry and a pointer. In this case, the entries are 123.120.*.*; 116.190.*.*; 116.190.78.*.; 116.*.*.*; and, 115.178.5.5.

The pointer corresponding to each entry points to a subset of the expanded rule base which contains all the rest of the conditions for those rules which are matched by the condition in the corresponding entry. For example, for the entry 116.190.78.*, the pointer should point to the following subset of the expanded rule base:

R3: Class C: src=116.190.78.*; dest=120.190.78.1, sport=30

R4: Class D: src=116.190.78.*; dest=121.190.78.1, sport=40

R5: Class E: src=116.190.78.*.; dest=122.190.78.1, sport=50

R6": Class F: src=116.190.78.*; dest=189.78.1.1, sport=60

R7": Class G: src=116.190.78.*; dest=122.190.*.*, sport=50

R2': Class B: src=116.190.78.*; dest=123.190.78.1, sport=20

R9": Class I: src=116.190.78.*; dest=123.190.78.*, sport=40

In this subset, consider the dest parameter. The rules in this subset of the expanded rule base specify conditions on the value for dest. We have 122.190.*.* ⊂ 122.190.78.1, and 123.190.78.* ⊂ 123.190.78.1. We expand the subset of the rule base in a similar manner to the above expansion for the src dimension.

We expand R7" by adding rule R7'" to yield:

R7": Class G: src=116.190.78.*; dest=122.190.*.*, sport=50

R7'": Class G: src=116.190.78.*; dest=122.190.78.1, sport=50

We expand R9" by adding rule R9'" to yield:

R9": Class I: src=116.190.78.*; dest=123.190.78.*, sport=40

R9'": Class I: src=116.190.78.*; dest=123.190.78.1, sport=40

Then we select all distinct dest address prefix conditions in the subset of the rule base to construct a second level table. This table will be pointed by the pointer in the first level table which corresponds to the src prefix condition src=116.190.78.*. This second-level table will include the following dest prefix conditions:

120.190.78.1; 121.190.78.1; 122.190.78.1; 189.78.1.1; 122.190.*.*;

123.190.78.1; and 123.190.78.*.

The pointer corresponding to each entry in this second-level table should point to a subset of the subset of the expanded rule base. The subset of the subset of the rule base contains all the rest of the conditions for those rules which are matched by the src condition which has a pointer to that second-level table and which are matched by the dest condition specified by the entry in the second-level table. For example, for the entry 122.190.78.1 in the second level table, the pointer should point to the following subset of the expanded rule base:

R5: Class E: src=116.190.78.*.; dest=122.190.78.1, sport=50

R7'": Class G: src=116.190.78.*; dest=122.190.78.1, sport=50

We then construct a third-level table (which is the final level table in this example). The final level table has a class ID associated with each entry. If a parameter value matches the conditions corresponding to two different class IDs, we can use a disambiguating rule, such as longest-prefix matching rule, to resolve this ambiguity. If no suitable disambiguating rule can be used to resolve the ambiguity then the original rule base contains a conflict.

Longest-prefix matching may be used in an attempt to resolve such conflicts by examining the original rules before they were expanded. The rule that contains the combination of longest prefixes for src and dest may then be given preference. For example, consider the entry for 122.190.78.1. For sport=50, we have two rules:

R5: Class E: src=116.190.78.*; dest=122.190.78.1; sport=50

R7'": Class G: src=116.190.78.*; dest=122.190.78.1; sport=50

The pointer corresponding to sport=50 seems to point to two class IDs: E and G. If we examine the original rules R5 and R7:

R5: Class E: src=116.190.78.*; dest=122.190.78.1; sport=50

R7: Class G: src=116.*.*.*; dest=122.190.*.*; sport=50

In this example, rule R5 clearly contains the longest combination of prefixes, so the pointer may be set to point to class E.

Consider another closely related example where the original rules Rm and Rn are:

Rm: Class 1: src=116.190.78.*; dest=122.190.78.1; sport=50

Rn: Class 2: src=116.190.78.130; dest=122.190.78.*; sport=50

In this case, the combination of src and dest have equivalent prefix lengths. To resolve this situation one should remove the probable conflict in the rule set or, as a less preferred alternative, one could adopt an arbitrary rule to give priority to one rule or the other.

Continuing with the previous example, for the entry 123.190.78.1 in the second level table, the pointer should point to the following subset of the expanded rule base:

R9''': Class I: src=116.190.78.*; dest=123.190.78.1, sport=40

R2': Class B: src=116.190.78.*; dest=123.190.78.1, sport=20

The table may be represented as follows:

| | |
|---|---|
| 40 | I |
| 20 | B |

In this case, there is no conflict.

EXAMPLE 2

In this example, each packet signature contains values for src, sport, and dport. We introduce the notation 40–60⊕50–70 to indicate that the range 40–60 overlaps with the range 50–70 and we have the following rule base:

R1: Class A: src=123.23.*.*, sport=10–50, dport=60–100

R2: Class B: src=123.*.*.*, sport=30–60, dport=110

In this example, the data structure will contain three levels of tables. The first table is for conditions on src, the second-level tables are for conditions on sport, and the third-level tables are for conditions on dport.

To construct the first table, we have 123.*.*.* 123.23.*.*. We expand R2 to yield two rules, R2 and R2' as follows:

R2: class B: src=123.*.*.*, sport=30–60, dport=110

R2': class B: src=123.23.*.*, sport=30–60, dport=110

For the condition 123.23.*.* in the first table, we have a subset of the expanded rule base:

R1: Class A: src=123.23.*.*, sport=10–50, dport=60–100

R2': class B: src=123.23.*.*, sport=30–60, dport=110

To construct the table for sport corresponding to src=123.23.*.*, we have the following overlapping relation: 10–50⊕30–60. In this case, we need to expand both R1 and R2': as follows. Expanding R1 yields:

R1: Class A: src=123.23.*.*, sport=10–50, dport=60–100

R1': Class A: src=123.23.*.*, sport=10–29, dport=60–100

R1'': Class A: src=123.23.*.*, sport=30–50, dport=60–100

Expanding R2' yields:

R2': class B: src=123.23.*.*, sport=30–60, dport=110

R2'': class B: src=123.23.*.*, sport=30–50, dport=110

R2''': class B: src=123.23.*.*, sport=51–60, dport=110

For overlapping relations, after a rule is expanded, we do not keep the original rule in the table. In the above case we would discard rules R1 and R2. For src=123.23.*.*, we will only consider entries: 10–29; 30–50 51–60. We organize these conditions in a second level table in the same way as before. For example, for the entry containing the condition sport=30–50, there is a corresponding pointer which points to a third level table for dport. The third level table corresponds to the following subset of the expanded rule base:

R1'': Class A: src=123.23.*.*, sport=30–50, dport=60–100

R2'': Class B: src=123.23.*.*, sport=30–50, dport=110

The third-level table for dport will have the following entries:

| | |
|---|---|
| 60-100 | A |
| 110 | B |

The above procedure can be extended for any number of parameters.

The data structure of the invention may also be used to test a set of classification rules for conflicts. This may be done by preparing a data structure as set out above, expanding the data structure as set out above, and checking to see whether there are any entries in any final level table which should correspond to more than one class.

As will be apparent to those skilled in the art in the light of the foregoing disclosure, many alterations and modifications are possible in the practice of this invention without departing from the spirit or scope thereof.

For example, while the invention has been described primarily with reference to IP packets, the invention could also be practiced with packets formatted for other network protocols. The invention may be practiced in any context where it is necessary to perform multi-dimensional classification of packets. The classification parameters do not need to correspond to values which can be extracted from IP packet headers. The invention may even be used to support multiple protocols concurrently. In this case the value for the layer 3 packet type may be used to identify the protocol for each incoming packet. For each protocol a different set of parameter values will make up the signature of a packet. A signature is generated for each packet by reading the values of that protocol-specific set of parameters. Packets in each protocol can then be classified using the methods of the invention, as set out above.

While the foregoing specification has described classification as being done at a demarcation unit, the classification methods and apparatus of the invention have application at any place in a network where it is necessary to classify data packets.

Embodiments of the invention may be implemented through the use of programmed general purpose computer processors or through the use of special hardware.

The tables which collectively make up each level of the data structure may comprise flat tables, trees, or other searchable data structures.

Preferred implementations of the invention may include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

Accordingly, the scope of the invention is to be construed in accordance with the substance defined by the following claims.

We claim:

1. A method for classifying data packets in a network, the method comprising, in a packet handling device:
   a) providing a set of packet classification rules embodied in a plurality of lookup tables, the lookup tables comprising a first table containing conditions on a first parameter and one or more subsequent tables linked to the first table and containing conditions on one or more corresponding subsequent parameters, the rules defining a plurality of classes;
   b) reading a signature comprising values for a plurality of parameters of an incoming data packet;
   c) identifying one of the subsequent tables by searching the first table for a match between one of the conditions and a first parameter value of the signature and sequentially searching identified subsequent tables for conditions matching subsequent parameter values, each time obtaining a pointer identifying a next one of the subsequent lookup tables, wherein a condition is duplicated in two different subsequent tables; and,
   d) searching a final one of the subsequent tables for a match to a final parameter value and obtaining a class identifier corresponding to a matched rule.

2. The method of claim 1 wherein, in at least one of the tables, the conditions include a first condition which is matched by any of a plurality of specific parameter values.

3. The method of claim 2 wherein, in at least one of the tables, the first condition is matched by any parameter value in a range of parameter values.

4. The method of claim 3 wherein, for at least one of the parameter values, searching the lookup table comprises finding a table entry having a condition which provides a longest prefix match to the parameter value.

5. The method of claim 1 wherein searching at least one of the tables comprises searching for a best match to the parameter value.

6. The method of claim 5 wherein, whenever a table contains two or more different conditions which could be simultaneously matched by a parameter value and a first one of the two or more conditions has a higher precedence than a second one of the two or more conditions, a next level one of the tables corresponding to the first one of the two or more conditions duplicates one or more entries of a next level one of the tables corresponding to the second one of the two or more conditions.

7. The method of claim 6 wherein every next level one of the tables corresponding to the first one of the two or more conditions duplicates all entries of a next level one of the tables corresponding to the second one of the two or more conditions.

8. The method of claim 1 wherein providing a set of packet classification rules embodied in a plurality of lookup tables comprises:
   a) obtaining a set of classification rules, each of said classification rules specifying a set of conditions to be met by each of a plurality of parameter values in a packet signature, the parameter values comprising a first parameter value, a last parameter value and one or more intermediate parameter values; and,
   b) creating in an electronically readable memory a data structure providing a plurality of chains of linked conditions, the data structure comprising a first level lookup table associated with a first one of the parameter values, a plurality of intermediate lookup tables associated with each of the intermediate parameter values and a plurality of last level lookup tables associated with a last one of the parameter values;
   c) in the first level lookup table creating a plurality of entries each associating a distinct condition specified by the rules on the first one of the parameter values with a pointer to one of the intermediate lookup tables;
   d) in each intermediate lookup table creating one or more entries, each entry associating a distinct condition specified by the rules on an intermediate parameter value with a pointer to a subsequent lookup table;
   e) in the final level lookup table creating a plurality of entries each entry associating a distinct condition specified by the rules on the final one of the parameter values with a class identifier;
   wherein each possible path which follows the pointers from an entry in the first level table to an entry in a final level table provides a chain of linked conditions and each chain of linked conditions includes every condition in the set of conditions specified by one of the rules.

9. The method of claim 8 wherein providing a set of packet classification rules embodied in a plurality of lookup tables further comprises:
   a) identifying two or more entries in either the first level table or any one of the intermediate level tables, the two or more entries containing distinct conditions which could be simultaneously matched by a parameter value;
   b) identifying a group of two or more subsequent level tables pointed to by such entries; and,
   c) in one of the two or more subsequent level tables which corresponds to a higher priority one of the distinct conditions, duplicating entries from another of the two or more subsequent level tables which corresponds to a lower priority one of the distinct conditions.

10. The method of claim 9 wherein the higher priority condition and the lower priority conditions each specify a match to a prefix and the prefix for the higher priority condition is longer than the prefix for the lower priority condition.

11. The method of claim 10 wherein providing a set of packet classification rules embodied in a plurality of lookup tables comprises:
   a) identifying all cases in the first level table and the intermediate level tables wherein two or more entries contain distinct conditions which could be simultaneously matched by a parameter value;
   b) for each case identifying a group of two or more subsequent level tables pointed to by such entries; and,
   c) for each case selecting each of the two or more subsequent level tables which corresponds to a higher priority one of the distinct conditions and in each such subsequent level table duplicating entries from each of the two or more subsequent level tables which corresponds to a lower priority one of the distinct conditions.

12. The method of claim 1 wherein the signature comprises three or more parameter values selected from the group consisting of: input port on which packet arrived; source IP address; destination IP address; source UDP or TCP port number; destination UDP or TCP port number; layer 3 packet type; Type of Service ("TOS") value; layer 4 packet type; TCP acknowledgement flag; and, time of packet arrival.

13. The method of claim 1 where the signature comprises at least a time parameter and one or more address parameters and wherein the condition on at least one of the one or more address parameters is a best matching condition.

14. The method of claim 1 wherein one of a plurality of search engines is associated with each table and wherein searching a table comprises searching using the search engine corresponding to the table.

15. The method of claim 1 wherein backtracking is reduced by providing a set of packet classification rules embodied in a plurality of lookup tables by:
  a) for each group of conditions in the first level table or in an intermediate level table, identifying every case wherein two or more distinct conditions in the same group could be simultaneously matched by a parameter value;
  b) for each case, identifying a group of two or more subsequent level tables which correspond to the distinct conditions; and,
  c) for each case, selecting each of the two or more subsequent level tables which does not correspond to a lowest priority one of the distinct conditions and in each such subsequent level table duplicating all entries from each of the two or more subsequent level tables which correspond to lower priority ones of the distinct conditions.

16. A medium carrying a set of computer-readable signals corresponding to instructions which, when run on a computer, cause the computer to perform a method for classifying data packets in a network, the method comprising:
  a) reading a signature comprising values for a plurality of parameters of an incoming data packet;
  a) determining a class for the data packet from the signature by searching a set of packet classification rules embodied in a plurality of lookup tables, the lookup tables comprising a first table containing conditions on a first parameter and one or more subsequent tables linked to the first table and containing conditions on one or more corresponding subsequent parameters, the rules defining a plurality of classes, searching the set of packet classification rules comprising:
    i) identifying one of the subsequent tables by searching the first table for a match between one of the conditions and a first parameter value of the signature and sequentially searching identified subsequent tables for conditions matching subsequent parameter values, each time obtaining a pointer identifying a next one of the subsequent lookup tables, wherein a condition is duplicated in two different subsequent tables; and,
    ii) searching a final one of the subsequent tables for a match to a final parameter value and obtaining a class identifier corresponding to a matched rule.

17. Apparatus for classifying data packets, the apparatus comprising:
  (a) a processor capable of obtaining a signature comprising N parameter values for the packet to be classified, where N is an integer with N>=3;
  (b) a memory accessible to the processor;
  (c) a data structure in the memory, the data structure comprising N levels of tables, the tables including a first level lookup table associated with a first one of the parameter values, a plurality of intermediate lookup tables associated with each of one or more intermediate parameter values and a plurality of final level lookup tables associated with an $N^{th}$ one of the parameter values, each of the tables containing entries which include a condition on a parameter value which corresponds to the table, wherein a condition is duplicated in two different tables at a same level;
  wherein the processor is adapted to, beginning with the first level table, iteratively, search a table for a condition which matches the parameter value in the signature which corresponds to the level to obtain a pointer to a subsequent table to search for a condition matching a subsequent parameter value in the signature of the packet until the processor identifies a final level table and wherein the processor is adapted to obtain the class identifier applicable to the packet by searching the final level table for a condition which matches the $N^{th}$ parameter value in the signature.

18. The apparatus of claim 16 wherein the processor provides at least two search engines, each level being associated to one of the at least two search engines, the search engine associated with each level adapted to search a table of that level for a condition which matches the parameter value in the signature which corresponds to that level.

* * * * *